(12) United States Patent
Liddle

(10) Patent No.: US 12,097,683 B2
(45) Date of Patent: Sep. 24, 2024

(54) TRANSPARENT STRUCTURE WITH ELECTRICALLY CONDUCTIVE ELEMENTS

(71) Applicant: Richard Liddle, Gateshead Tyne and Wear (GB)

(72) Inventor: Richard Liddle, Gateshead Tyne and Wear (GB)

( * ) Notice: Subject to any disclaimer, the term of this patent is extended or adjusted under 35 U.S.C. 154(b) by 339 days.

(21) Appl. No.: 16/624,293

(22) PCT Filed: Jun. 19, 2018

(86) PCT No.: PCT/GB2018/051693
§ 371 (c)(1),
(2) Date: Dec. 18, 2019

(87) PCT Pub. No.: WO2018/234777
PCT Pub. Date: Dec. 27, 2018

(65) Prior Publication Data
US 2020/0122435 A1    Apr. 23, 2020

(30) Foreign Application Priority Data
Jun. 19, 2017  (GB) ..................... 1709766

(51) Int. Cl.
*B32B 17/10*  (2006.01)
*H01B 1/08*  (2006.01)

(52) U.S. Cl.
CPC .. *B32B 17/10174* (2013.01); *B32B 17/10045* (2013.01); *H01B 1/08* (2013.01)

(58) Field of Classification Search
None
See application file for complete search history.

(56) References Cited

U.S. PATENT DOCUMENTS

| 2009/0114928 A1* | 5/2009 | Messere | B32B 17/10559 257/88 |
| 2010/0176705 A1* | 7/2010 | Van Herpen | B32B 17/10761 313/46 |
| 2017/0254518 A1* | 9/2017 | Vasylyev | F21V 13/14 |

FOREIGN PATENT DOCUMENTS

| DE | 202008008318 U1 * | 12/2009 | ....... B32B 17/10036 |
| JP | 104147219 A | 5/1992 | |

OTHER PUBLICATIONS

Bib Data and translation ; DE-202008008318-U1; Dec. 2009 (Year: 2009).*
International Search Report and Written Opinion dated Oct. 23, 2018, for PCT Application No. PCT/GB2018/051693.

* cited by examiner

*Primary Examiner* — Humera N. Sheikh
*Assistant Examiner* — Elizabeth D Ivey
(74) *Attorney, Agent, or Firm* — Kinney & Lange, P.A.

(57) ABSTRACT

An electrical current transmission system for transmitting an electrical current to an object via a substantially transparent structure, wherein the substantially transparent structure includes at least one transparent layer and at least two transparent electrically conductive elements. The substantially transparent structure further comprises means for connecting the at least two electrically conductive elements to an external power supply, and means for transfer of electrical current from the transparent structure to the object. The at least two electrically conductive elements are separated by a part of the structure which is electrically insulating.

13 Claims, 8 Drawing Sheets

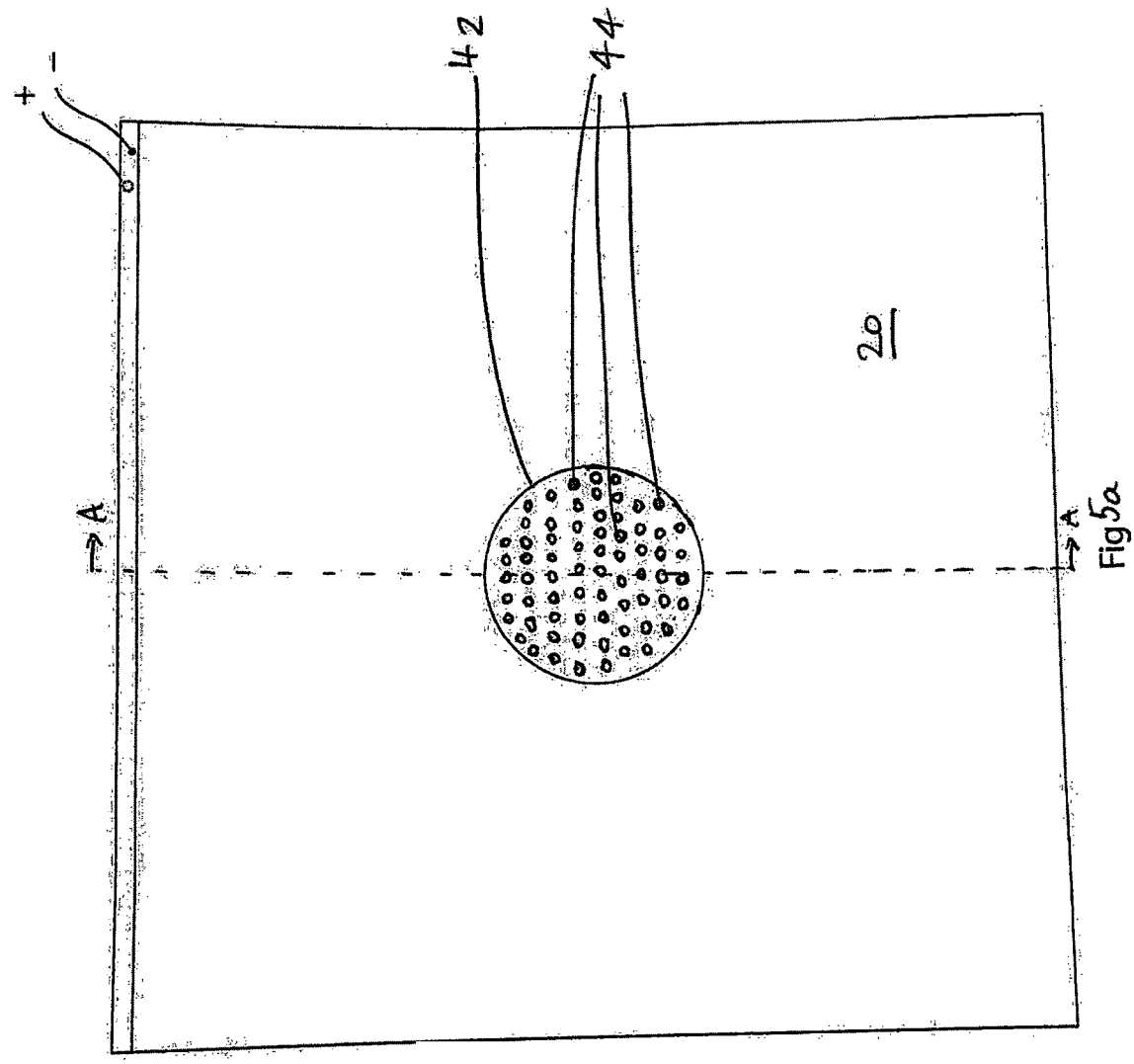
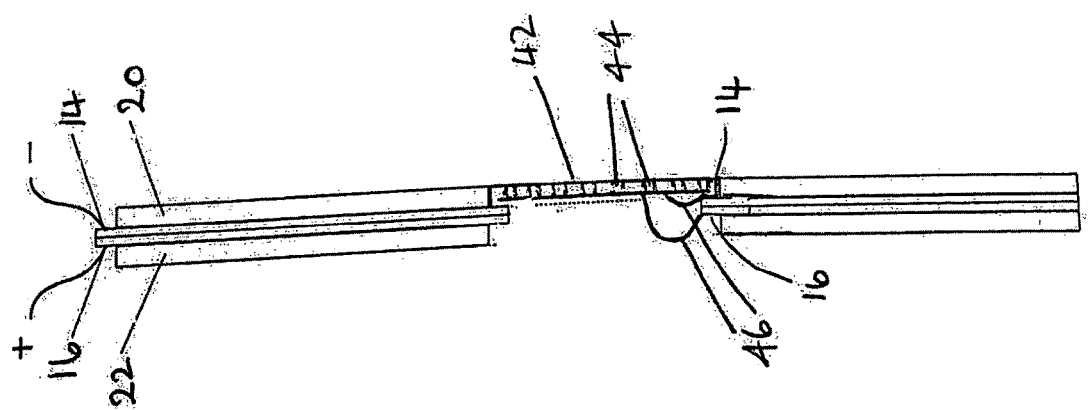

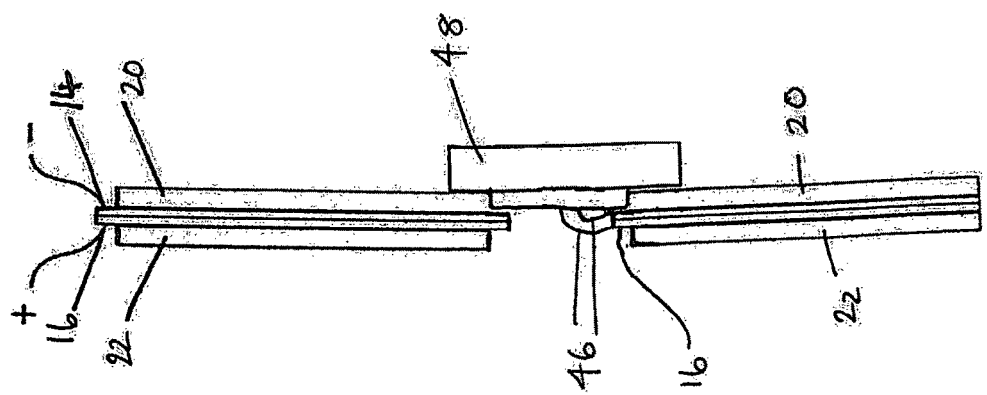
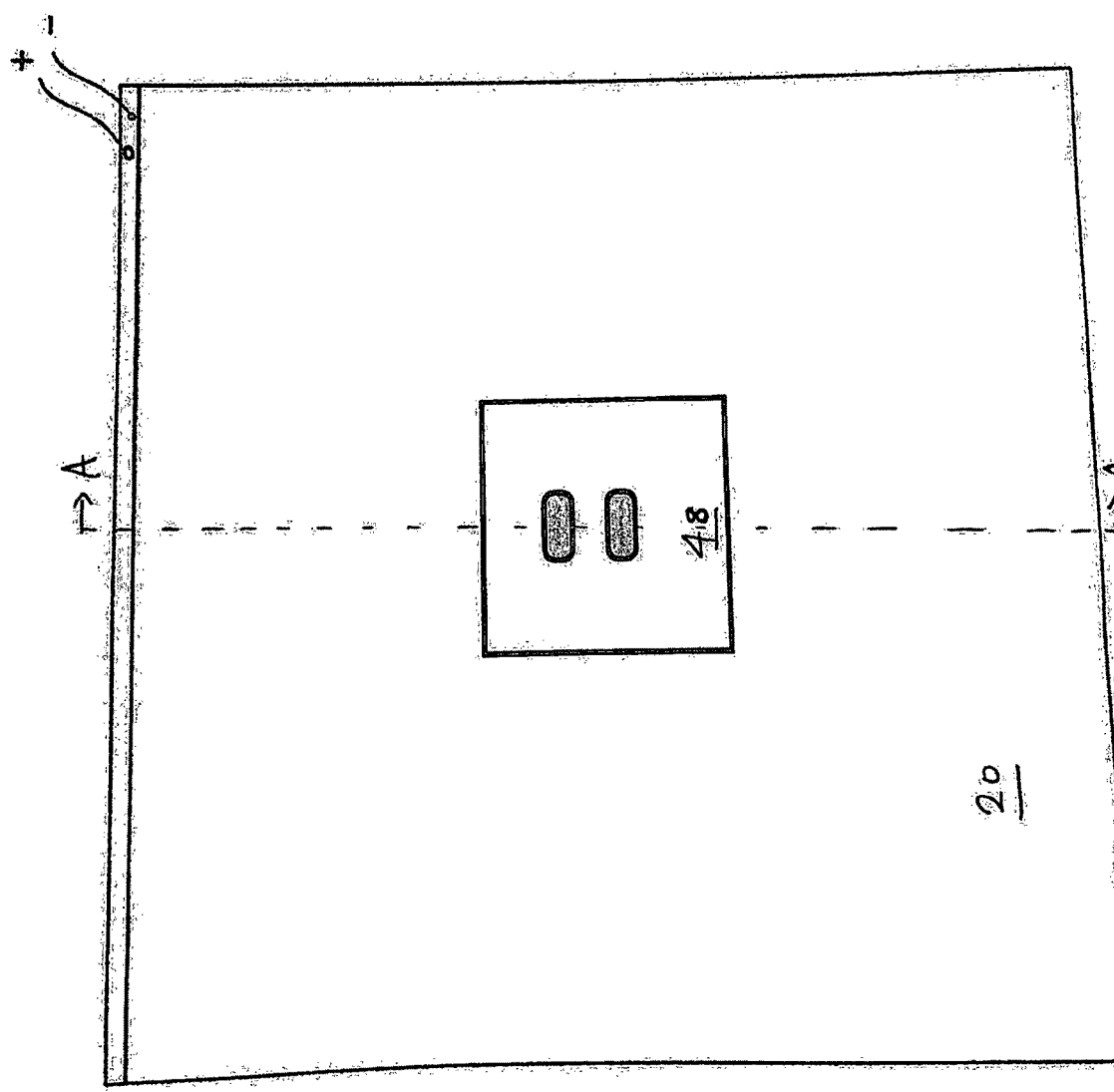

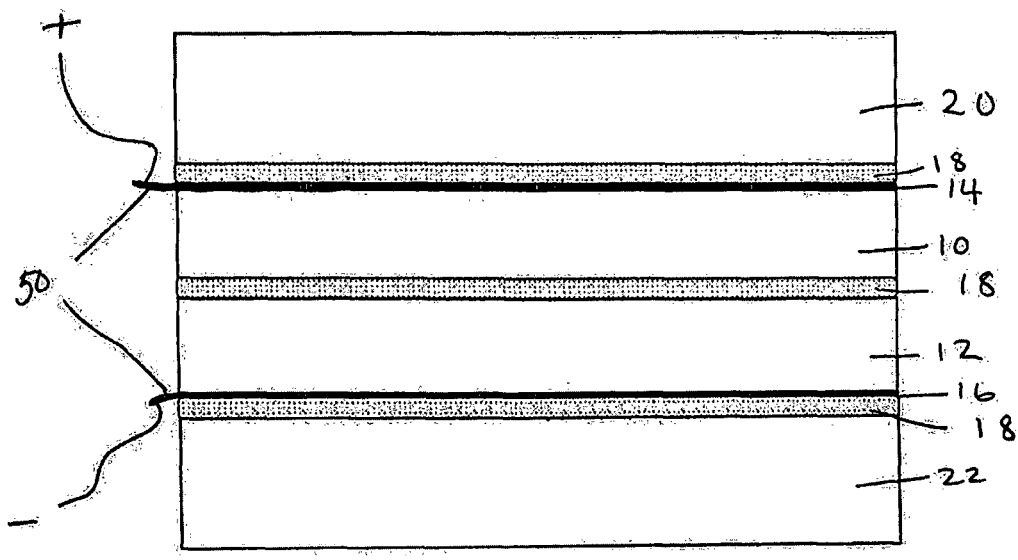
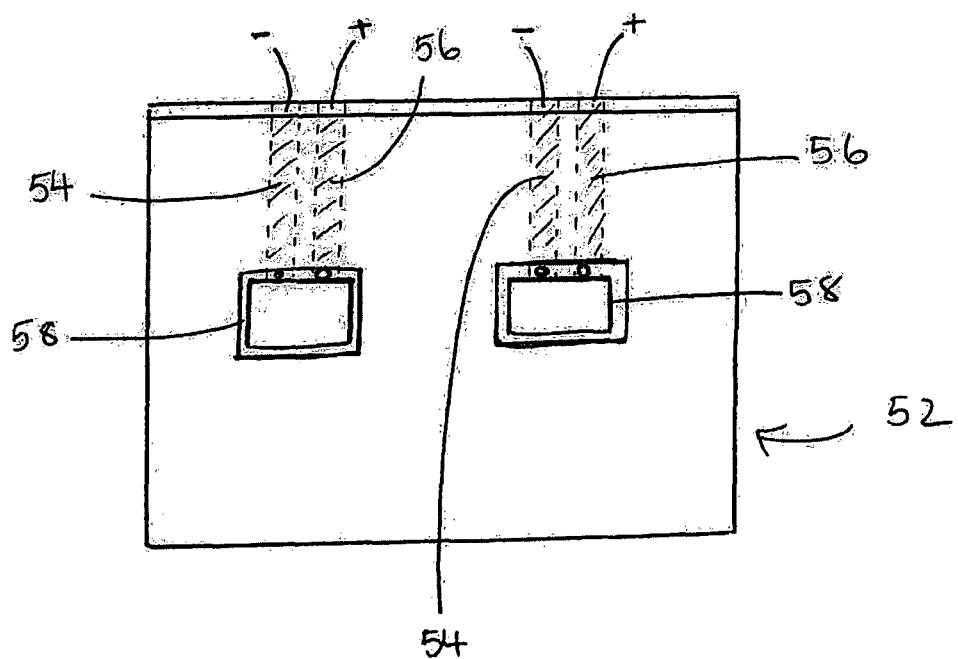

TRANSPARENT STRUCTURE WITH ELECTRICALLY CONDUCTIVE ELEMENTS

TECHNICAL FIELD

The present disclosure relates to a transparent structure having electrically conductive elements contained therein, and in particular to such a transparent structure including a power outlet.

BACKGROUND

There has long been a desire to be able to provide power within glass without exposed cabling. Many attempts have been made to provide solutions to this problem. One such solution is described in United Kingdom patent no 2423144B. This patent describes a light which is mounted between the opposing faces of two spaced apart glass panes. The inner surfaces of the glass panes are provided with an electrically conductive coating and the light includes a sliding connection which is electrically conductive. The means by which the light is mounted between the two panes of glass allows the position of the light to be adjusted.

Another lighting device is described in French patent application no 2,836,985. The lighting device of this patent comprises a lighting element mounted between an electrically conductive transparent surface and another electrically conductive surface. Electricity from the respective electrically conductive surfaces power the lighting element mounted therebetween. The lighting element includes two contacts each in electrical connection with one of the said electrically conductive surfaces. One of the contacts consists of a brush contact filament. The lighting element includes at least one magnet situated substantially adjacent to a backing plate. The lighting unit is held in place by a magnet aligned with the magnet of the lighting element, but on the other side of the backing plate. The lighting element may be moved by moving the magnet on the other side of the backing plate, and a hand-grip is provided to facilitate this.

Whilst the developments described in the patent applications mentioned above provide certain advantages, they require spaced apart panes of glass which do not provide the same aesthetically pleasing effect as a single transparent element.

It would therefore be desirable to provide an improved structure that permits electrical power to be delivered to an electricity consuming device located within or on a transparent material.

SUMMARY

According to a first aspect of the present disclosure, there is provided an electrical current transmission system for transmitting an electrical current to an object via a substantially transparent structure, wherein the substantially transparent structure includes at least one transparent layer and at least two transparent electrically conductive elements; the substantially transparent structure further comprising means for connecting the at least two electrically conductive elements to an external power supply, and means for transfer of electrical current from the transparent structure to the object; wherein the at least two electrically conductive elements are separated by a part of the structure which is electrically insulating.

The substantially transparent structure may be laminar and include at least two transparent layers. The at least two transparent electrically conductive elements may be located in between the at least two transparent layers.

The substantially transparent structure may further comprise at least one core transparent layer. Preferably the core transparent layer is electrically insulating.

Preferably each electrically conductive element is located between the at least one core layer and an outer transparent layer.

Preferably the transparent layers are bonded together using a lamination process.

The means for connecting the at least two electrically conductive elements to an external power supply may be located along at least one edge of the substantially transparent structure. The means for connecting the at least two electrically conductive elements to an external power supply may comprise electrical connectors.

Preferably the at least two transparent electrically conductive elements are in the form of electrically conductive layers. More preferably the at least two electrically conductive layers are provided in the form of transparent electrically conductive coatings or films applied to one or more of the transparent layers. Preferably the transparent electrically conductive coating is a transparent conducting oxide. The transparent conducting oxide may be indium tin oxide. Alternatively, the transparent conducting oxide may be fluorine doped tin oxide or deposed zinc oxide.

Alternatively, the at least two electrically conductive layers may be provided in the form of electrically conductive tracks. The electrically conductive tracks may be in the form of electrically conductive coatings or films applied to parts of one or more of the transparent layers. Alternatively, the electrically conductive tracks may be provided by etching an electrically conductive coatings or films applied to one or more of the transparent layers.

Preferably, the transparent structure further comprises at least one aperture.

Preferably, the means for the transfer of electrical current from the transparent structure to the object comprises electrical connectors located within the aperture.

The object may be a lighting element, a power socket, a USB socket, a mobile phone, an induction charging unit, or any other device which may receive electrical current.

Preferably the or each transparent layer is a glass layer.

The present disclosure provides a system that permits electrical power to be delivered to an electricity consuming device located within or otherwise connected to a substantially transparent structure.

BRIEF DESCRIPTION OF THE DRAWINGS

In the drawings, which illustrate preferred embodiments of an electrical current transmission system according to the present disclosure:

FIG. 5a is a plan view of the panel of FIG. 4a with a lighting element installed therein;

FIG. 5b is a cross section through the panel of FIG. 5a, taken along the line A-A;

FIG. 6a is a plan view of the panel of FIG. 4a with a power socket installed therein;

FIG. 6b is a cross section through the panel of FIG. 6a, taken along the line A-A;

FIG. 7 illustrates the panel of FIG. 1, with an alternative means for connecting an object to the panel; and FIG. 8 illustrates a schematic plan view of a further example of a panel forming part of the electrical current transmission system according to the present disclosure.

DETAILED DESCRIPTION OF THE PREFERRED EMBODIMENTS

The present disclosure relates to an electrical current transmission system comprising a transparent panel which includes at least two internal electrically conductive elements and allows electrical current to be transferred through the panel. The following examples use glass layers to make up the transparent panel, but glass could be substituted for other suitable transparent materials.

Figure 1A:
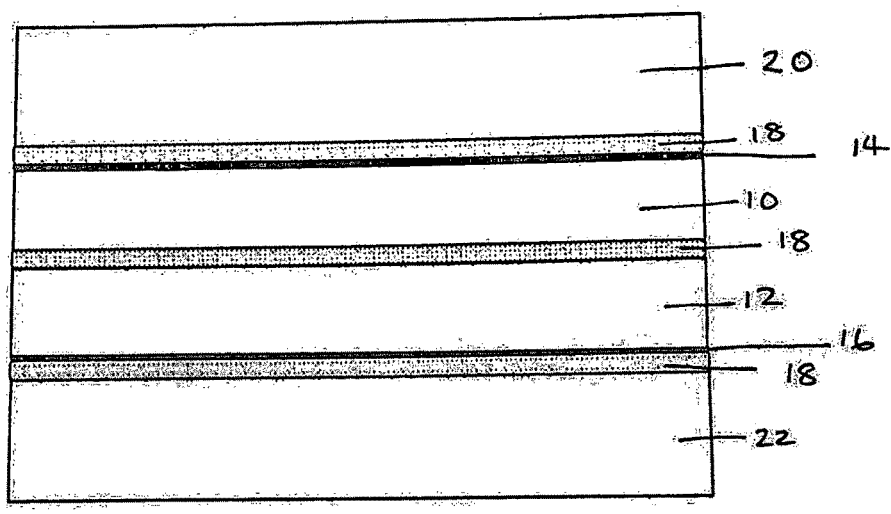
FIG. 1a illustrates a cross section through an example of a panel forming part of the electrical current transmission system according to the present disclosure.
Figure 1B:
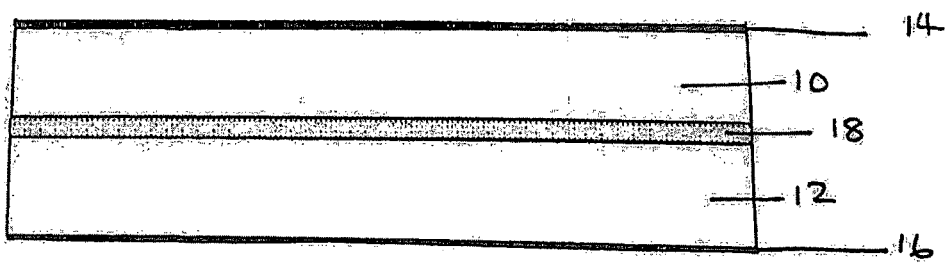
FIG. 1b illustrates a cross section through an alternative example of a panel forming part of the electrocution current transmission system according to the present disclosure.

FIG. 1a illustrates a cross section through an example of a transparent panel forming part of the system of the present disclosure. This example is a laminar structure and includes two core layers 10, 12 each being a glass panel provided with an electrically conductive element in the form of an electrically conductive coating 14, 16. Glass panels provided with such a coating are available commercially. Examples of suitable coatings include metallic transparent conducting oxides such as Indium Tin Oxide but other conductive coatings are available. The core layers 10, 12 are laminated together using a laminating film 18. The layers are arranged such that the conductive coating layers 14, 16 are facing outwards. The two core layers 10, 12 are sandwiched between two non-conductive glass panels 20, 22, which are bonded to the core layers 10, 12 using a laminating film 18. The process for producing laminated glass panels would be well known to a person skilled in the art. The two outer glass panels 20, 22 are not necessary for the function of the structure, but are present to provide a protective layer over the conductive coatings 14, 16. FIG. 1b illustrates the panel of FIG. 1a without the two outer layers 20, 22 present.

Figure 2A:
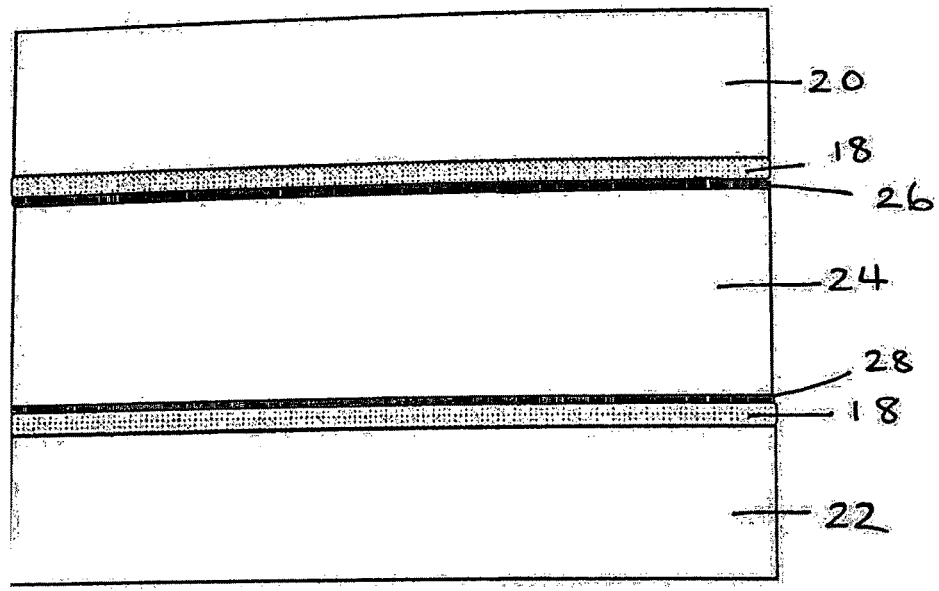
FIG. 2a illustrates a cross section through a further example of a panel forming part of the electrical current transmission system according to the present disclosure.
Figure 2B:
FIG. 2b illustrates a cross section through an alternative further example of a panel forming part of the electrical current transmission system according to the present disclosure.

FIG. 2a illustrates a cross-section through another example of t transparent panel forming part of the system of the present disclosure. In this example, the two core layers 10, 12, have been replaced by one core
layer 24, this layer provided with an electrically conductive coating 26, 28 on each side of the panel. The core layer 24 is again sandwiched between two non-conductive glass panels 20, 22, which are bonded to the core layer 24 using a laminating film 18. Again, the two outer glass panels 20, 22 are not necessary for the function of the structure. FIG. 2b illustrates the panel of FIG. 2a without the two outer layers 20, 22 present.

Figure 3:
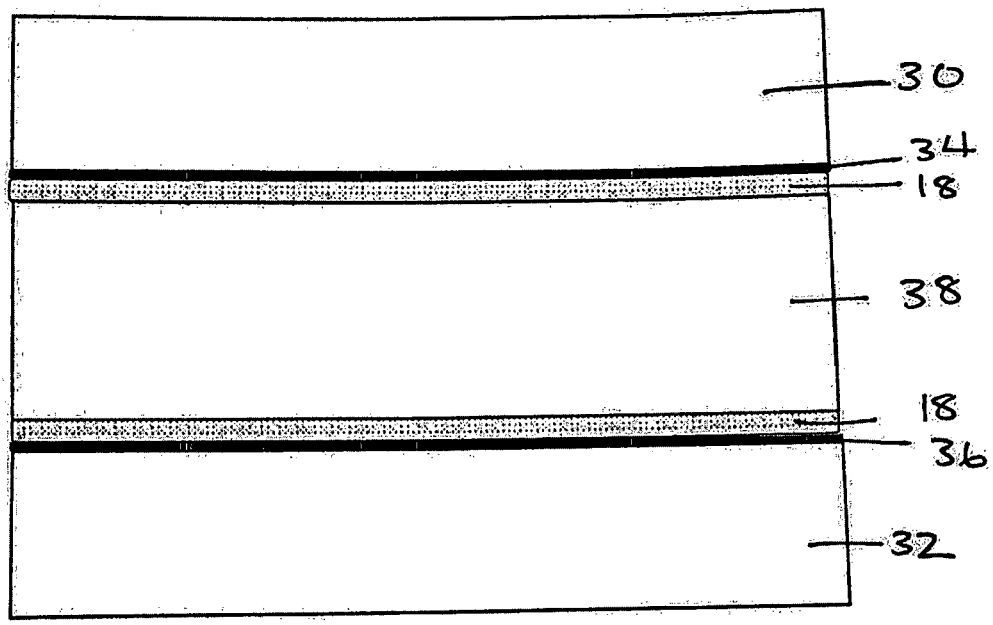
FIG. 3 illustrates a cross section through a further example of a panel forming part of the electrical current transmission system according to the present disclosure.

FIG. 3 illustrates a cross section through a further example with an alternative configuration. In this example the two outer layers 30, 32 are each provided with an electrically conductive coating 34, 36. The two outer layers 30, 32 are sandwiched around a core layer 38 of non-conductive glass with the conductive coatings 34, 36 facing inwards towards the core layer 38. All three layers are bonded together using a laminating film 18.

Figure 4A:
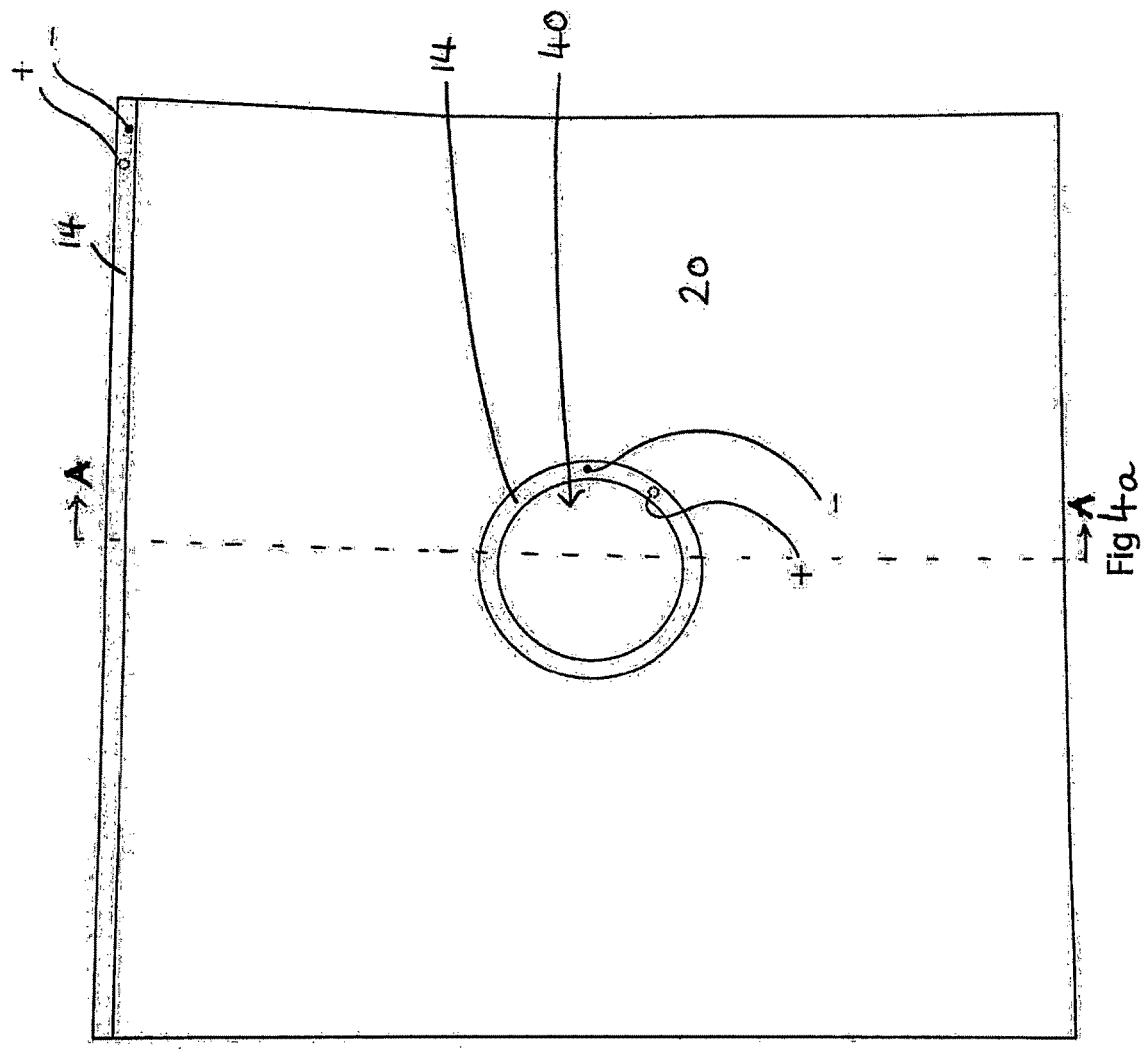
FIG. 4a is a plan view of the panel of FIG. 1.
Figure 4B:
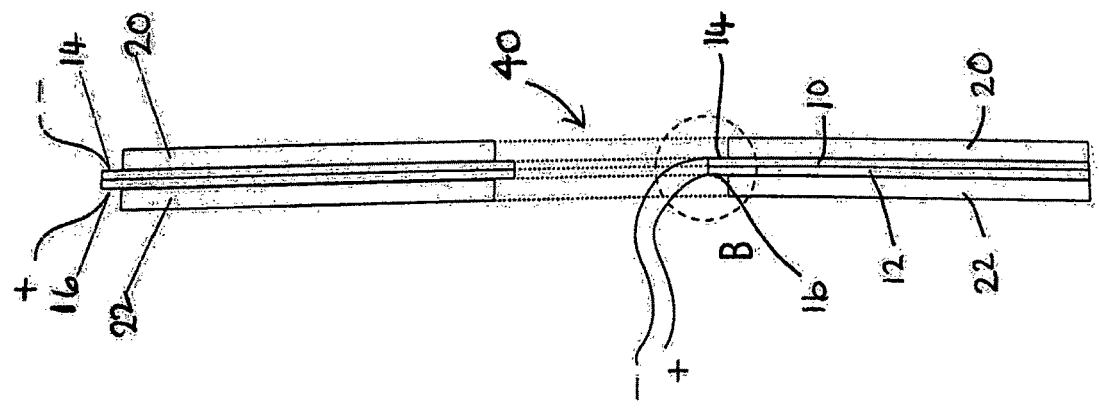
FIG. 4b is a cross section through the panel of FIG. 4a, taken along the line A-A.

FIG. 4a illustrates a plan view of a panel 1 constructed from the laminar arrangement illustrated in FIG. 1a. As shown in FIGS. 4a and 4b, the top and bottom panels 20, 22 have been cut slightly smaller than the other panels along at least one edge either prior to the lamination process, or after the lamination process has been completed. This allows the electrically conductive coatings 14, 16, to be exposed at at least one side of the panel 1, and allows the conductive coatings 14, 16 to be connected to a power supply. An aperture 40 has also been cut into each of the panels 10, 12, 20, 22. The aperture may be cut prior to carrying out the lamination process, or after the lamination process has been completed. The aperture illustrated in FIG. 4a is circular in shape, but can be any shape. As shown in FIGS. 4a and 4b, in this example the aperture cut into the top and bottom non-conductive glass panels 20, 22 is larger than the aperture cut into the core layers 10, 12. This provides a stepped arrangement shown more clearly in FIGS. 4b and 4c which exposes the electrically conductive coatings 14, 16 within the aperture 40, allowing an object to be electrically connected to the conductive coatings 14, 16. The object, such as a lighting element, may be connected to and/or inset into the aperture 40. The object may be shaped and sized to correspond with the shape and size of the aperture 40 such that it sits flush within the upper panel 20. The object illustrated in FIGS. 5a and 5b is a lighting element 42 comprising a plurality of LEDs 44, the lighting element 42 sits flush with the surface of the upper panel 20. The lighting element 42 is connected to the transparent conductive coatings 14, 16 embedded in the laminar structure of the panel 1 via wiring 46 at the rear of the panel 1. Instead of a lighting element, the object connected to the transparent conductive coatings 14, 16 could be an induction charging unit. Induction charging units include transmitter coils and allow wireless charging of external devices such as mobile phones which include receiver coils.

In an alternative arrangement, the object to be powered by the panel 1 may sit proud of the upper panel 20. FIGS. 6a and 6b illustrate such an arrangement. In this arrangement only part of the object, such as a power socket 48, is received within the aperture 40.

Figure 4C:
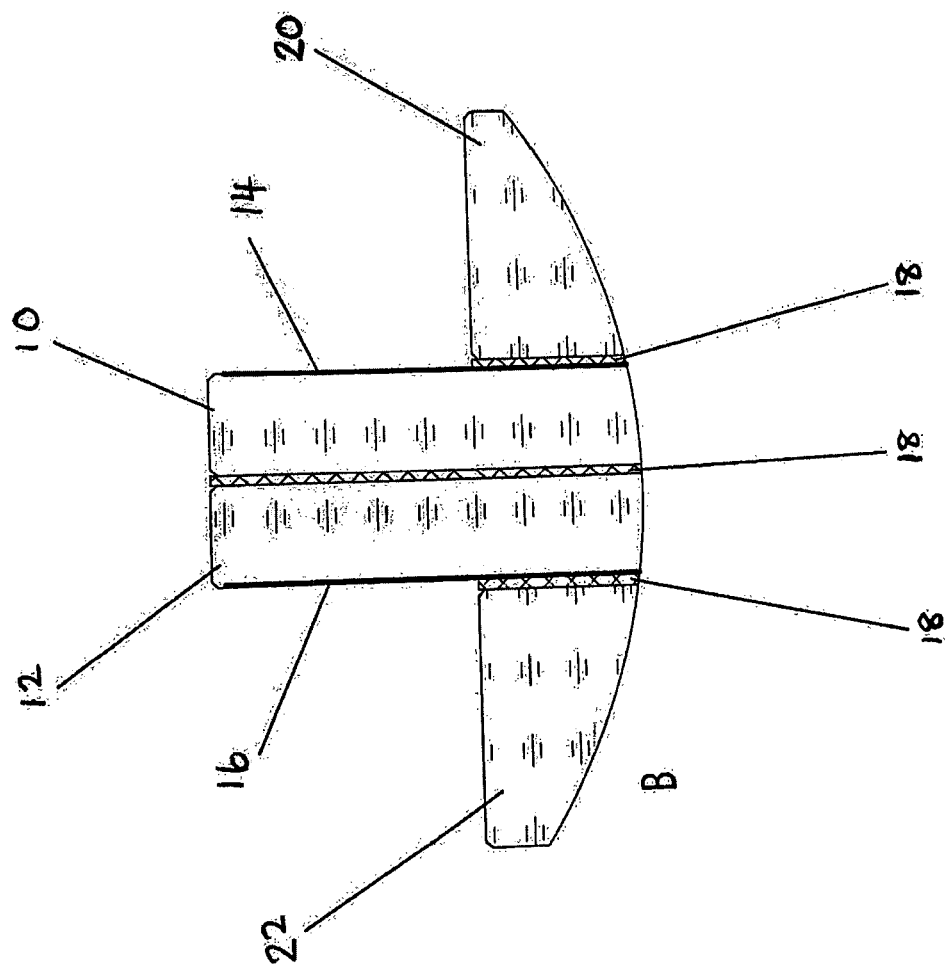
FIG. 4c is an enlarged view of the part of FIG. 4b labelled 'B'.

The stepped arrangement illustrated in FIGS. 4b and 4c is not required if a wire or conductive strip or tab 50 is inserted between the layers, as shown in FIG. 7. Such a conductive strip 50 could be inserted as part of the lamination process, or could be added after the lamination process, for example using a conductive epoxy to secure the strip 50 to the panel. All that is required is a means to connect an object, and a power supply, to the electrically conductive layers of the panel 1.

Rather than providing electrically conductive layers that cover a whole surface of a panel, the electrically conductive elements may be provided in tracks. An example is illustrated in FIG. 8, which shows a transparent panel 52 provided with electrically conductive tracks 54, 56 in the form of electrically conductive coatings applied to certain parts of one or more of the transparent layers and sandwiched between and bonded to transparent layers as previously described. Alternatively, the tracks may be provided by etching an electrically conductive coating applied to one or more of the transparent layers. The tracks 54, 56 lead to apertures 58 where objects such as lighting elements or power sockets may be located and electrically connected to the tracks. The tracks 54, 56 are separated by uncoated areas which are electrically insulating. Fewer layers may be necessary if the conductive elements are provided in tracks, since the conductive elements may be located on one layer.

Multiple pairs of positive and negative electrically conductive tracks may be provided as shown in FIG. 8. Alternatively, multiple pairs of positive and negative electrically conductive layers may be provided.

The multi-layered transparent panel is not limited to the transfer of electrical power. The provision of a conductor within the panel allows for the transmission of electrical signals. Hence, data may be transferred via the conductive layers. When the electrically conductive layers are provided in tracks, or where multiple electrically conductive layers are provided the multilayers transparent panel can be used to allow transmission of both electrical power and electrical signals separately.

The invention claimed is:

1. An electrical current transmission system for transmitting an electrical current to an object via a substantially transparent structure, wherein:
   the substantially transparent structure is a laminar structure and includes at least one transparent layer and a pair of transparent electrically conductive elements in the form of electrically conductive layers having at least one insulating layer between and separating the electrically conductive layers;
   each of the electrically conductive layers and the at least one insulating layer occupy different planes within the substantially transparent structure;
   the substantially transparent structure further comprises means for connecting each of the electrically conductive elements to an external power supply, such that a first of the pair of electrically conductive layers forms a positive electrode and a second of the pair of electrically conductive layers forms a negative electrode; and
   the substantially transparent structure further comprises at least one aperture, the aperture exposing a region of each of the electrically conductive layers, such that the object is electrically connectable to each of the electrically conductive layers to allow transfer of electrical current from the transparent structure to the object.

2. An electrical current transmission system according to claim 1, wherein the substantially transparent structure includes at least two transparent layers and the pair of transparent electrically conductive elements are located in between the at least two transparent layers.

3. An electrical current transmission system according to claim 1, wherein the at least one insulating layer comprises at least one core transparent layer that is electrically insulating.

4. An electrical current transmission system according to claim 3, wherein each electrically conductive element is located between the at least one core transparent layer and at least one transparent layer.

5. An electrical current transmission system according to claim 1, wherein the substantially transparent structure includes more than one transparent layer, and the transparent layers are bonded together using a lamination process.

6. An electrical current transmission system according to claim 1, wherein the pair of electrically conductive layers are provided in the form of transparent electrically conductive coatings applied to one or more of the transparent layers.

7. An electrical current transmission system according to claim 6, wherein the transparent electrically conductive coating is a transparent conducting oxide.

8. An electrical current transmission system according to claim 1, wherein the pair of electrically conductive layers are provided in the form of electrically conductive tracks.

9. An electrical current transmission system according to claim 8, wherein the electrically conductive tracks are in the form of electrically conductive coatings applied to parts of one or more of the transparent layers.

10. An electrical current transmission system according to claim 8, wherein the electrically conductive tracks are provided by etching electrically conductive coatings applied to one or more of the transparent layers.

11. An electrical current transmission system according to claim 1, wherein the means for the transfer of electrical current from the transparent structure to the object comprises electrical connectors located within the aperture.

12. An electrical current transmission system according to claim 1, wherein the or each transparent layer is a glass layer.

13. An electrical current transmission system according to claim 1, wherein the object is selected from the group consisting of: a lighting element, a power socket, a USB socket, a mobile phone and an induction charging unit.

* * * * *